May 3, 1932. T. P. HINGLEY 1,857,022
TUBE COUPLING
Filed Nov. 6, 1930
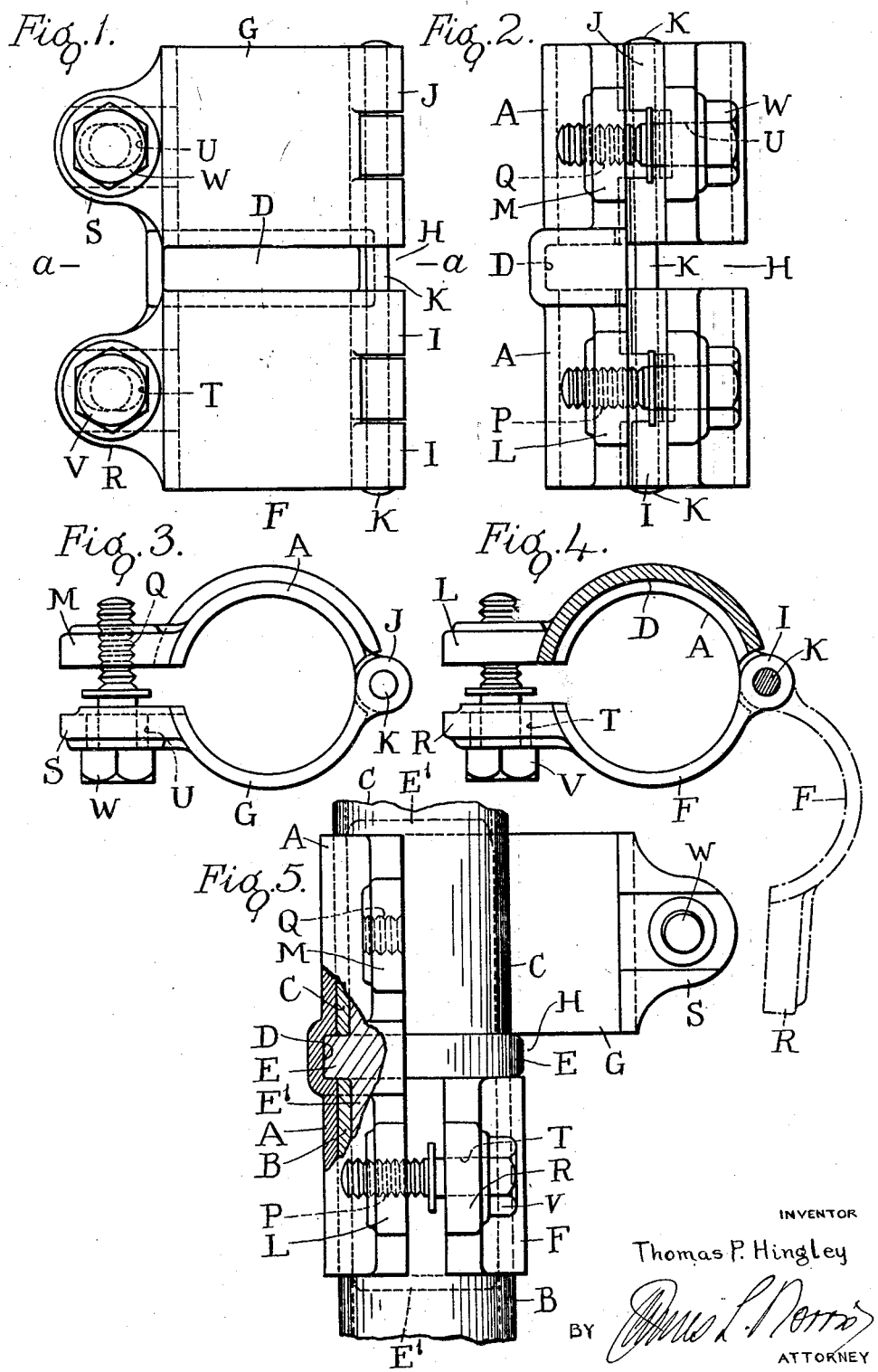
INVENTOR
Thomas P. Hingley
BY
ATTORNEY Patented May 3, 1932

1,857,022

UNITED STATES PATENT OFFICE

THOMAS PROSSER HINGLEY, OF LONDON, ENGLAND

TUBE COUPLING

Application filed November 6, 1930, Serial No. 493,851, and in Great Britain December 19, 1929.

With the present method of connecting tubes, and especially those used for scaffolding, together in axial alignment, a short length of rod having a peripheral ring between its ends is employed and one end of this rod is positioned inside the end of the tube and the other tube is passed over the other end of the rod with the ring between the two tubes, the ring being of smaller external diameter than the outer diameter of the tubes. The ends of the tubes, and the rod and ring are clamped firmly together by a hinged coupling consisting of two curved members hinged together at one edge and provided with lips at the other edges having screw threaded holes engageable by bolts for tightening the coupling on to the tubes.

It has been found that, after a scaffolding having these appliances has been erected some time, atmospheric influence affects the rod and tubes and causes them to adhere together so that, when the coupling is removed, it sometimes occurs that, when a tube is removed, it will take with it the rod and ring which must then be removed or will fall away from it and, if the tubes are at a height from the ground, the rod and ring may fall and may occasion injury to a workman below.

Now the object of my invention is to avoid these disadvantages by constructing the coupling in such a manner that it may temporarily engage the ring so that the rod and ring will be held fast to one of the tubes while the other tube is being removed.

According to my invention I construct the coupling proper with a curved portion for contacting with the two tubes and I hinge to this curved portion two flaps or other curved portions, one for each tube, the ring carrying the rod being temporarily held to the curved portion which contacts with the two tubes, so that a tube can be released and removed on the opening of one flap, the other flap securing the curved portion, rod and ring to the remaining tube until removed by hand.

My invention will be more fully understood from the following description aided by the annexed drawings, in which Figure 1 is an elevation of the coupling in the closed condition. Figure 2 is a similar view at right angles to that shown in Figure 1.

Figure 3 is an end view of the coupling.

Figure 4 is a section on the line $a\ a$ of Figure 1 and showing in broken lines the lower flap open.

Figure 5 is a view, partly in longitudinal section and partly in elevation, of a coupling connected to two tubes positioned in axial alignment and showing the lower flap secured to the curved portion of the other flap open, the rod and ring being shown in position.

In a simple construction, as shown on the drawings and in which the ring and rod are temporarily engaged by the curved portion, I construct the curved portion A of a shape and depth to encircle about one half of the two adjoining tubes B, C and with a groove D to receive the ring E which is of larger external diameter than the tubes B, C and forms part of or is secured to the centre of the rod $E^1$, and I hinge at one edge of the portion A, on opposite sides of the groove D, two curved flaps or members F, G, each of a shape to encircle the other half of the tubes B, C, one for each tube, and I leave a space H between the adjacent ends of the hinge portions I, J of these two members F, G and opposite the groove D with the hinge pin K of the two members F, G extending across the space H.

On the free edge of the curved portion A, I provide lips or projections L, M having screw threaded holes P, Q and I provide the flaps F, G with lips or projections R, S with holes T, U, aligning, respectively, with the screw-threaded holes P, Q. A bolt V extends through the hole T in the lip R to engage the screw-threaded hole P, and a similar bolt W extends through the hole U of the lips S to engage the screw-threaded hole Q, whereby the flaps F, G can be bolted to the curved portion A to grip the tubes.

The external diameter of the ring E is larger than that of the tubes B, C and fits within the groove D of the portion A and between the adjacent ends of the flaps F, G, so that, when one end of the rod $E^1$ is positioned in a tube, say B, the ring E will bear against an end of said tube and thus be held temporarily to the curved portion A of the coupling when the coupling is secured to one of the tubes, say B. When the other end of the rod $E^1$ is inserted in an end of the other tube C and the flap G is secured, the two tubes B, C will be held firmly together. When one tube, say C, is to be removed its flap G is released and the tube C removed, the remaining flap F securing the curved piece A, ring E and rod $E^1$ to the remaining tube B.

The rod $E^1$ may be round or square and, if square, the corners only would contact with the insides of the tubes B, C thus preventing said rod from sticking to the tubes, due to corrosion or other causes, and the rod $E^1$ may be in two pieces screwed or otherwise connected to the ring and projecting on both sides thereof.

What I do claim as my invention and desire to obtain by Letters Patent is:—

1. A coupling for connecting tubes together in axial alignment, comprising a rod having a peripheral ring between its ends and of which the opposite ends are adapted for insertion, respectively, in the ends of a pair of tubes to be connected together, a curved member having a pair of flaps hinged thereto at one edge, one for each tube; means on the flaps and curved member for securing them together, and means on the curved member for engaging the ring of said rod when said rod is positioned within the tubes with its ring positioned between the tubes.

2. A coupling for connecting tubes together in axial alignment, comprising a curved portion having a groove and also having projections at one edge and hinge portions at the other edge, two flaps positioned, respectively, on opposite sides of the groove and hingedly connected to the hinge portions of the curved portion with a space therebetween and having projections coinciding with the projections on the curved portion and fastening means engaging the projections of said curved portion and flaps for securing the flaps to the curved portion.

In testimony whereof I have hereunto set my hand.

THOMAS PROSSER HINGLEY.